No. 893,091. PATENTED JULY 14, 1908.
J. J. McLEAN.
CULTIVATOR.
APPLICATION FILED JAN. 16, 1908.

2 SHEETS—SHEET 1.

WITNESSES
Phil E. Barnes
J. J. Sheehy Jr.

INVENTOR
John J. McLean
By James Sheehy, Attorney

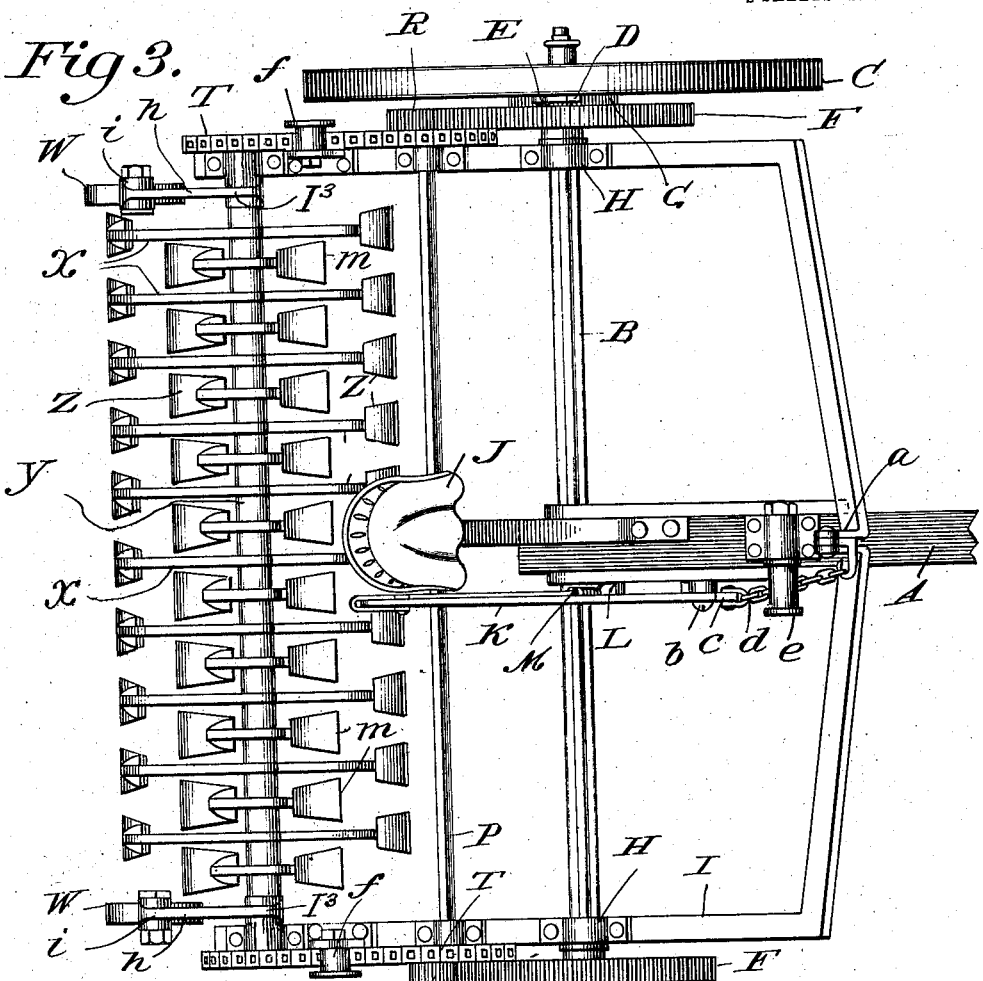
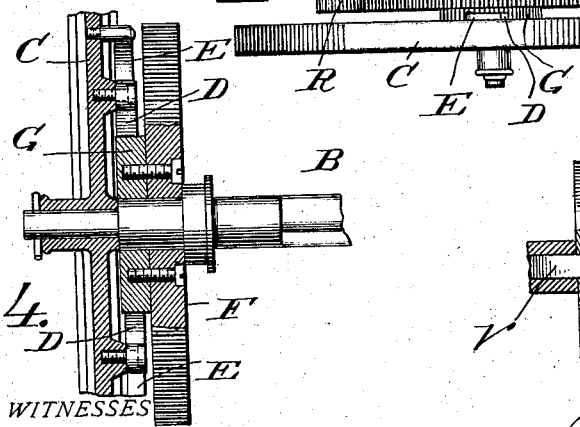
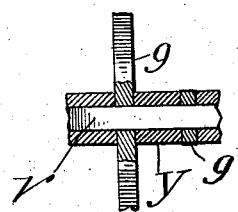

UNITED STATES PATENT OFFICE.

JOHN JAMES McLEAN, OF MOOSE JAW, SASKATCHEWAN, CANADA.

CULTIVATOR.

No. 893,091.　　　　Specification of Letters Patent.　　　Patented July 14, 1908.

Application filed January 16, 1908. Serial No. 411,071.

*To all whom it may concern:*

Be it known that I, JOHN J. MCLEAN, citizen of Canada, residing at Moose Jaw, in the Province of Saskatchewan and Dominion of Canada, have invented new and useful Improvements in Cultivators, of which the following is a specification.

My invention pertains to wheel cultivators; and it contemplates the provision of a cultivator constructed with a view of being light of draft, and one embodying means whereby it is enabled to lift the earth and shake it up so as to thoroughly pulverize the same and put it in good shape for seeding, and is at the same time enabled to cut out weeds and shake the ground from the same and leave the weeds on top of the ground so as to effectually destroy the weeds.

Figure 1:
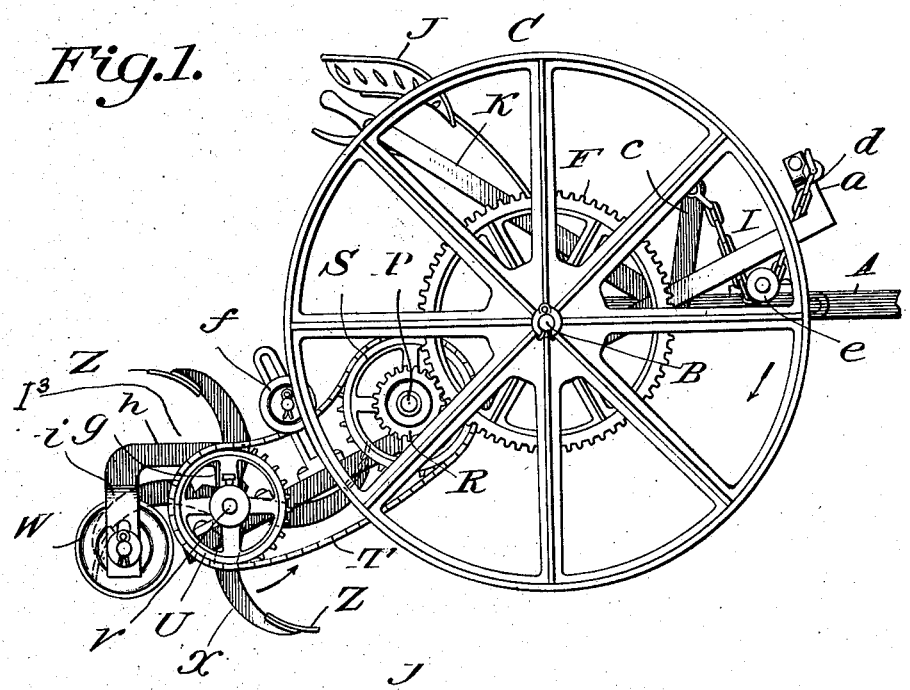
Figure 2:
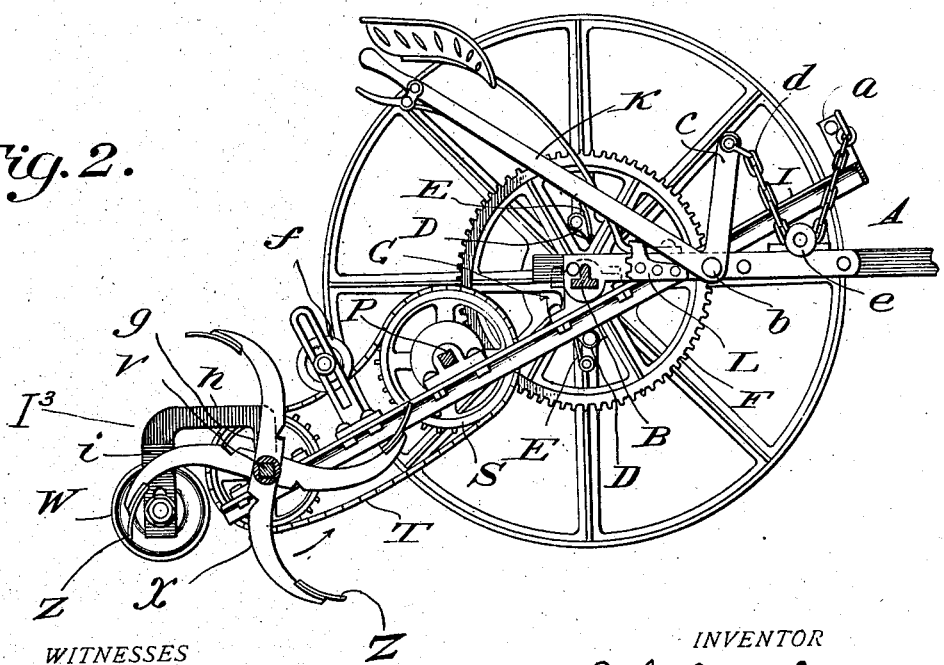

Other advantageous characteristics peculiar to my invention will be fully understood from the following description and claim when the same are read in connection with the drawings accompanying and forming part of this specification, in which:

Figure 1 is a side elevation of the cultivator constituting the best practical embodiment of my invention of which I am cognizant; the same being shown with the plurality of rotary knives in their working position. Fig. 2 is a longitudinal vertical section of the cultivator. Fig. 3 is a plan view of the same. Fig. 4 is an enlarged detail section illustrative of the connection between one of the ground wheels of the cultivator and the adjacent spur gear. Fig. 5 is an enlarged detail section illustrating the relative arrangement of the alternate knives on the shaft, of angular form in cross-section, by which said knives are carried.

Similar letters designate corresponding parts in all of the views of the drawings, referring to which:

A is the tongue of my novel cultivator, and B is the axle which is connected to the tongue in such manner that it is held against rotation.

Loosely mounted on the end portions of the axle B are ground wheels C having pawls D backed by springs E, and also loosely mounted on said axle B are spur gears F having ratchets G for the engagement of the pawls D; the teeth of the said ratchets being so disposed as to assure rotation of the spur gears F with the ground wheels C when the cultivator is moved forward, and to leave said spur gears idle when the cultivator is backed.

Pivoted at H H on the axle B is a frame I which, as best shown in Fig. 3, comprises side bars, a forward portion, and an arm *a* reaching upward from the middle of said forward portion. The said frame is arranged to swing vertically on the axle B, and the cultivator driver located on the seat J is enabled to raise the portion of the frame in rear of the axle B when necessary through the medium of the mechanism illustrated, which mechanism comprises a hand lever K, fulcrumed at *b* on the tongue A and having an upwardly reaching arm *c*, and a cable *d*, preferably a chain as shown, passed under a sheave *e* on the tongue A and connected at one end to the arm *a* of the frame I and at its other end to the arm *c* of the lever K. By depressing the lever K the driver on the seat J is obviously enabled to depress the forward portion of the frame I and raise the rear portion of said frame; and in order to enable the driver to adjustably fix the rear portion of the frame in its raised position, as when the cultivator is to be turned or when it is to be drawn from one point to another without working, I provide the fixed rack L, Fig. 2, on the tongue A, and the spring-pressed detent M, Fig. 3, arranged when the lever K is depressed to be engaged with the said rack. The said detent M is located at the left hand side of the lever K and is engaged with the rack L only when the rear portion of the frame I is raised; the scheme of my invention depending upon the weight of the rear portion of the frame I and the working parts carried thereby to retain said working parts down in their working position.

Loosely mounted on the ends of a shaft P carried by the rear portion of the frame I and intermeshed with the spur gears F are pinions R, and fixed to the said pinions R and arranged at the inner sides thereof are sprocket gears S. Around the said sprocket gears S are passed sprocket belts T which are also passed around sprocket gears U on a rear transverse shaft V, journaled in suitable bearings on the side bars of the frame I, whereby it will be seen that when the spur gears F are rotated in a forward direction, the shaft V will be rotated in a rearward direction—*i. e.*, in the direction indicated by the arrow in Fig. 2. With a view of enabling the operator of the cultivator to take up slack of the sprocket belts T whenever the same is necessary, I provide the idlers $f$ which engage the upper stretches of the belt and are adjustably connected, preferably in the conventional manner illustrated, with the side bars of the frame I.

$I^3 I^3$ are arms which are fixed with respect to the side bars comprised in the frame I, and are carried upwardly at $g$, rearwardly at $h$ and downwardly at $i$; the said downwardly extending portions being bifurcated and vertically slotted to permit of vertical adjustment and adjustable fixture of wheels W which are designed to travel on the ground and support the rear portion of the frame I and by so doing regulate the depth to which the knives, presently described, penetrate the ground.

The shaft V is of angular form in cross-section, and arranged on said shaft so as to turn therewith are the rotary cultivator knives X, separated by spacing collars Y after the manner illustrated in Fig. 5, and also in Fig. 3. The said knives X each describe a compound curve, and the middle portion of the alternate knives are disposed at right angles to each other, Figs. 1 and 2, so that immediately subsequent to the passage of a blade Z of one knife through the ground, a blade of a knife at the side of the first mentioned blade will pass through the ground and in that way assist the first mentioned blade in removing weeds from the ground and thoroughly pulverizing the ground to render the same fit for seeding. Each of the knives is provided with two blades Z fixed to the ends thereof, and the said blades are of the configuration shown in Fig. 3—i. e., are gradually increased in width to their outer edges $m$ which are arranged parallel to the shaft V, this being advantageous since the said blades are not liable to pass weeds without removing the same from the ground.

In the practical use of my novel cultivator, it will be evident that the weight of the knives and the other parts on the rear portion of the frame I serves to hold the said knives down to their work, and consequently the cultivator is very light of draft. It will also be evident that when the cultivator is drawn forward, the knives X will be rotated in a rearward direction, as indicated by arrow in Fig. 2, this being advantageous since it enables the knives to cut in a scraping manner which is essential to the effectual elimination of weeds. It will further be evident that during the operation of the cultivator, the knives strike the weeds suddenly, and cut the same off and scatter them on top of the ground, and at the same time thoroughly pulverize the ground and put the same in excellent condition for seeding.

The construction herein illustrated and described constitutes the best practical embodiment of my invention known to me, but it is obvious that in the future practice of the invention such changes or modifications may be made as fairly fall within the scope of my invention as defined in the claims appended.

Having described my invention, what I claim and desire to secure by Letters-Patent, is:

The combination in a cultivator, of a tongue, an axle fixed to the tongue, ground wheels loosely mounted on the axle, spur gears also loosely mounted on the axle and arranged to be turned by the ground wheels when the latter are rotated forwardly, a vertically swinging frame pivoted on and extending fore and aft of the axle, a lever mounted on the tongue and connected with the forward portion of the frame, means for adjustably fixing said lever, wheels carried by the rear portion of the frame and arranged to bear on the ground and support said rear portion, rotary cultivating means mounted in the rear portion of the frame and equipped with sprocket gears, pinions carried by the frame and intermeshed with the said spur gears, sprocket gears fixed to the said pinions, and sprocket belts connecting the said sprocket gears and the sprocket gears of the rotary cultivating means.

In testimony whereof I have hereunto set my hand in presence of two subscribing witnesses.

JOHN JAMES McLEAN.

Witnesses:
 CHAS. E. ARMSTRONG,
 JOSEPHINE E. NAVIN.